United States Patent [19]

King et al.

[11] Patent Number: 5,047,946
[45] Date of Patent: Sep. 10, 1991

[54] AIRCRAFT NAVIGATIONAL SYSTEM AND METHOD FOR GUIDING AN AIRCRAFT ALONG INTERSECTING AIRWAYS

[75] Inventors: Ethmer W. King, Albuquerque, N. Mex.; Siamak H. Ghaffari, Santa Barbara, Calif.; David S. Yotsuuye, Renton, Wash.

[73] Assignee: The Boeing Company, Inc., Seattle, Wash.

[21] Appl. No.: 410,316

[22] Filed: Sep. 21, 1989

[51] Int. Cl.$^5$ .............................................. G06F 15/50
[52] U.S. Cl. .................................... 364/448; 364/444; 73/178 R
[58] Field of Search ...................... 364/443, 444, 448; 342/450, 451; 73/178 R

[56] References Cited

U.S. PATENT DOCUMENTS

| | | | |
|---|---|---|---|
| 4,086,632 | 4/1978 | Lione | 364/444 |
| 4,413,322 | 11/1983 | Foster et al. | 364/448 |
| 4,692,869 | 9/1987 | King et al. | 364/448 |
| 4,792,906 | 12/1988 | King et al. | 364/448 |

Primary Examiner—Gary Chin
Attorney, Agent, or Firm—Hughes & Multer

[57] ABSTRACT

An aircraft navigational system which provides flight data information for an aircraft to travel along a first airway to a point of intersection with a second airway and then along said second airway. The system determines whether the point of intersection is at a named waypoint common to both said first and second airways, or if the point of intersection is unnamed. If unnamed, the system computes the location of the unnamed point of intersection and provides flight path data to said unnamed point of intersection and then along said second airway.

29 Claims, 10 Drawing Sheets

AIRCRAFT NAVIGATIONAL SYSTEM AND METHOD FOR GUIDING AN AIRCRAFT ALONG INTERSECTING AIRWAYS

BACKGROUND OF THE INVENTION (a) Field of the Invention

The present invention relates to an aircraft navigational system and method by which an aircraft is caused to travel on the flight paths of two intersecting airways, and more particularly to such a system and method where an aircraft is able to fly along a first airway to a point of intersection with a second airway, which intersection may or may not be a known waypoint, and then to continue its course of travel from the point of intersection along the second airway to the point of final destination.

(b) Background Art

In present day aircraft navigational systems, it is common for a navigational computer of the system to cause the auto-pilot of the aircraft to direct the aircraft to fly along a predetermined flight path which is called an "airway". The airway is generally made up of a number of flight path segments or legs which lead from one "waypoint" to another from the point of departure to the point of destination. These waypoints may correspond to known locations on the ground surface where an actual facility exists, (e.g. a navigational station or NAVAID) or the waypoint could be simply a geographical location which is designated only by its latitude or longitude. In some instances, it is desirable or necessary for the aircraft to fly through a first portion of its flight along one airway to a location where this first airway intersects with a second airway. Then the aircraft will turn off the first airway to travel on the second airway to a destination point on the second airway.

Present day navigational systems are capable of directing the auto-pilot to fly the airplane along the first airway to the point of intersection and then along the second airway to the point of destination under circumstances where there is a waypoint at the intersection of the first and second airways. However, the present day navigational systems do not have the capability of directing the auto-pilot to fly this course under circumstances where the point of intersection of the two airways is not a known waypoint.

SUMMARY OF THE INVENTION

The present invention comprises an aircraft navigational system to provide flight path information for an aircraft to travel along a first airway to a point of intersection with a second airway, and then to travel along the second airway. This system comprises a flight path information input means adapted to receive and provide information designating said first airway as a first path of travel and information designating said second airway as a second path of travel.

There is a navigational computer means comprising a memory means which contains information of identification and locations of waypoints on the first and second airways. There is also identifying and calculating means to identify a first airway segment which is on said first airway and which intersects a second airway segment which is on said second airway, and to ascertain a location of an unnamed point of intersection on said first and second segments under circumstances where said unnamed point of intersection is not located at any waypoint on said first and second airways.

There is output flight control means operatively interconnected with said identifying and calculating means to provide flight path guidance data for a first flight path portion along the first segment to the point of intersection and for a second flight path portion from said point of intersection along said second segment. Thus, the flight test guidance data can be utilized to cause the airplane to travel along the first flight path portion and then along the second flight path portion.

In the preferred form, the identifying and calculating means also is able to ascertain whether a waypoint exists at a named point of intersection of said first and second airways. Further, the identifying and calculating means ascertains whether more than one point of intersection of said first and second airways exists and to select a first point of intersection which occurs first on said first path of travel and to select said first point of intersection as the point of intersection on which the second flight path portion is initiated.

More particularly, the navigational computer means is arranged to ascertain the unnamed point of intersection by calculating a distance from a waypoint on said first segment to the unnamed point of intersection and ascertaining location of the unnamed point of intersection by calculations based on said distance and on a bearing of said first segment. Specifically, the unnamed point of intersection is ascertained by ascertaining a distance and bearing from the waypoint on the first segment to a waypoint on the second segment, ascertaining an angle formed by a line from said waypoint on the first segment to the waypoint on the second segment with said second segment, and computing the distance from the waypoint on the first segment to the unnamed point of intersection trigonometrically from information of said distance from the waypoint on the first segment to the waypoint on the second segment, said angle, and a second angle which is formed by two sides of a triangle defined by said waypoints on said first and second segments and said unnamed point of intersection. The computation to identify said unnamed point of intersection is accomplished by application of a formula b=a Sin B/Sin A.

Also, in the preferred form, the present invention is arranged to identify a common waypoint on both of said first and second airways and to store said common waypoint, if said common waypoint exists, in a temporary memory means and to identify a distance from a previous waypoint on said first airway to the common waypoint, then to ascertain whether any unnamed point of intersection exists where there is no waypoint. Then the system ascertains whether both the unnamed point of intersection and the common waypoint exist, then calculates whether the common waypoint or the unnamed point of intersection is closest to said previous waypoint; then provides said flight path guidance data designating said first flight path portion from said previous waypoint to that point of intersection selected from the common waypoint and the unnamed point of intersection which is closer to said previous waypoint.

In a particular embodiment, the unnamed point of intersection is determined by identifying bearing of an initially examined segment of the first airway and then determining whether the bearing of the initially examined segment extends between any two waypoints on the second airway. The next step is to ascertain position of the initially examined segment relative to a segment extending between said any two waypoints on the second airway to ascertain whether the initially examined segment intersects with the segment which is between said any two waypoints. Under circumstances where the initially examined segment does not intersect with the segment between any two waypoints, then another segment on the first airway is examined by ascertaining bearing and location of said another segment relative to segments extending between waypoints on the second airway.

The method of the present invention is accomplished by initiating the steps outlined above relative to the system of the present invention.

Other features of the present invention will become apparent from the following detailed description.

DETAILED DESCRIPTION OF THE PREFERRED EMBODIMENT

The present invention is a further improvement in the basic navigational system which is disclosed in U.S. Pat. No. 4,692,869, entitled "Aircraft Navigational Systems and Methods for Creating Navigational Guidepoints", assigned to the same assignee as the present invention, with two of the co-inventors in the present application also being co-inventors in U.S. Pat. No. 4,692,869. The basic navigational system which is disclosed in U.S. Pat. No. 4,692,869 is (or may be) the same navigational system in which the present invention is (or may be) incorporated. In fact, the present invention can desirably be incorporated in the entire system described in U.S. Pat. No. 4,692,869, including the improvements which are specific to that patent. Accordingly, many of the details of that navigational system, as disclosed in U.S. Pat. No. 4,692,869, will not be described in detail herein, and only those portions of the navigational system will be described which are essential or directly helpful to an understanding of the present invention, it being understood that the entire subject matter of U.S. Pat. No. 4,692,869 is incorporated herein by reference.

It is believed that a clearer understanding of the present invention will be obtained by describing first the basic components of the navigational system in which the present invention is incorporated, and then describe the prior art manner in which an aircraft is caused to fly along a first airway to a point of intersection with a second airway, and then along a second airway to the point of destination, under circumstances where the point of intersection is not identified by a known waypoint. Then, the system and method of the present invention will be described.

Figure 1:
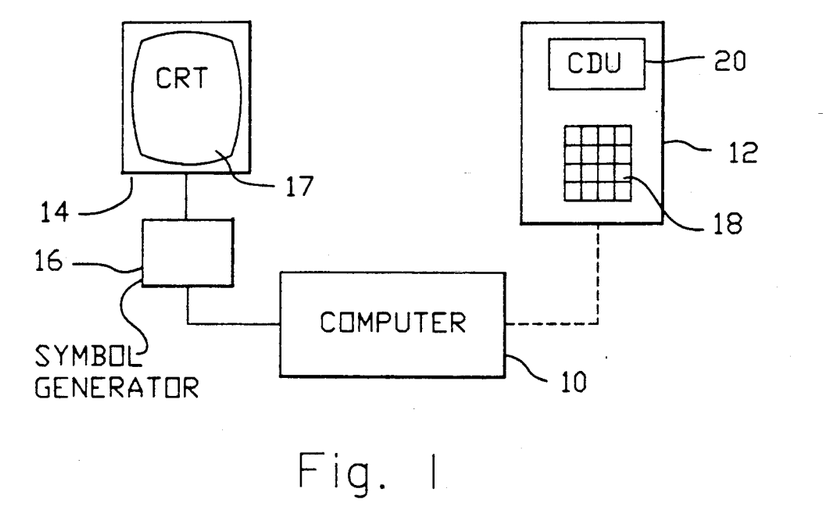
FIG. 1 is a block diagram of an aircraft navigational system incorporating the present invention.

With reference to FIG. 1 there is shown an aircraft navigational system comprising a navigational computer 10 interconnected with a control display unit 12 and a horizontal situation indicator 14. The horizontal situation indicator 14 comprises a character generator 16 and a CRT screen 17 which displays various flight information, such as the aircraft route of flight, as well as aircraft tack and heading information. The control display unit 12 (hereinafter called the CDU) and the CRT 17 are located in the aircraft cockpit so as to be readily visible to the air crew. The CDU 12 has an alphanumeric keypad 18 and a display window 20 located on the front of the CDU 12. The keypad 18 is used to enter flight navigational data into the computer 10 and also to select modes of operation. Further, the keypad 18 is used to control the display of data on the CRT screen 17 and also on the display window 20.

These components 10-20 described immediately above are utilized in the present invention and are also described in U.S. Pat. No. 4,692,892. By way of clarification, it should be noted that in U.S. Pat. No. 4,692,869 there is also disclosed as part of the aircraft navigational system a VOR receiver to receive radio signals from VHF omnirange stations. Such a VOR receiver could be (and quite likely would be) included in the overall navigational system incorporating the present invention. However, the operation of the present invention is not dependant upon receiving radio signals from any VOR station, so the VOR receiver is not shown in FIG. 1.

Figure 2:
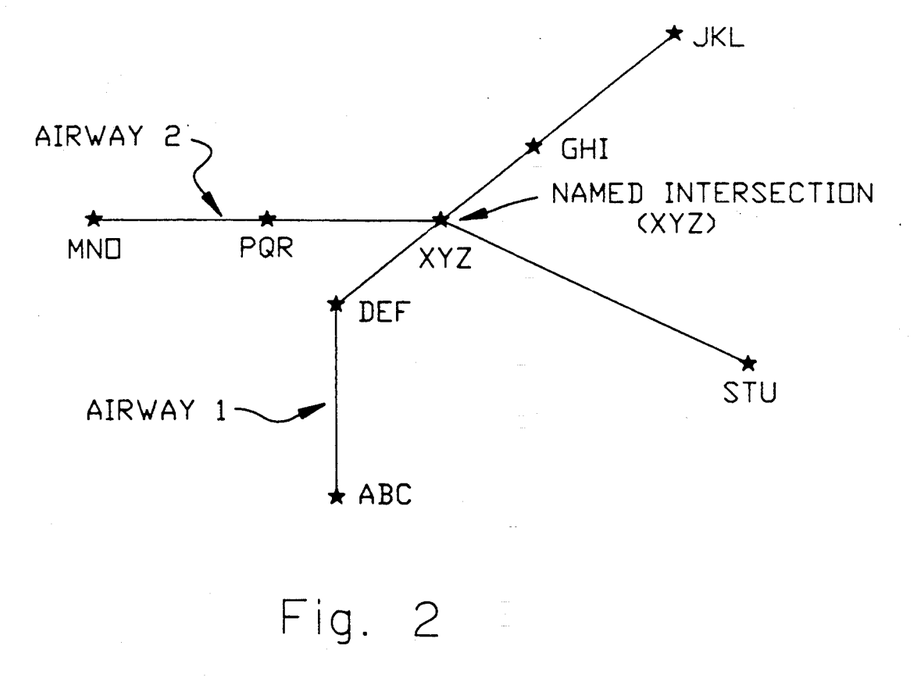
FIG. 2 is an illustration of two intersecting airways where there is a known waypoint at the point of intersection of the two airways, this being to illustrate the manner in which the prior art navigational systems can cause the airplane to travel along one airway to the point of intersection and then along a second airway to the point of destination.

Reference is now made to FIG. 2 to provide background information about the prior art manner in which an aircraft is able to fly along intersecting airways where there is a known waypoint at the point of intersection of the two airways. Let it be assumed that an aircraft is to fly along airway 1 from point ABC toward point JKL. As shown herein, airway 1 is made up of four flight legs or segments (i.e. ABC to DEF; DEF to XYZ; XYZ to GHI; and GHI to JKL). However, let it be assumed that instead of flying from point ABC all the way to point JKL, it is desired to fly the aircraft from point ABC to the point of intersection at XYZ and then to travel from XYZ along airway 2 to point MNO, where XYZ is an existing waypoint.

Present day flight control systems have the capability of flying such a route by autopilot along a first airway to the point of a known intersection then along the second airway to the destination. The pilot would simply load the various waypoints into the computer along with the instructions that the aircraft should follow a flight path that travels the flight path segments between these waypoints, and then the computer would direct the autopilot to follow that flight path.

By way of further background information (and as mentioned previously herein), these various waypoints such as ABC or DEF could be physical locations such as airports, NAVAID Stations or the like, or these waypoints could simply be a location that is identified by its latitude and longitude, with no particular underlying physical structure on the ground surface indicating that this would be a waypoint.

Figure 3:
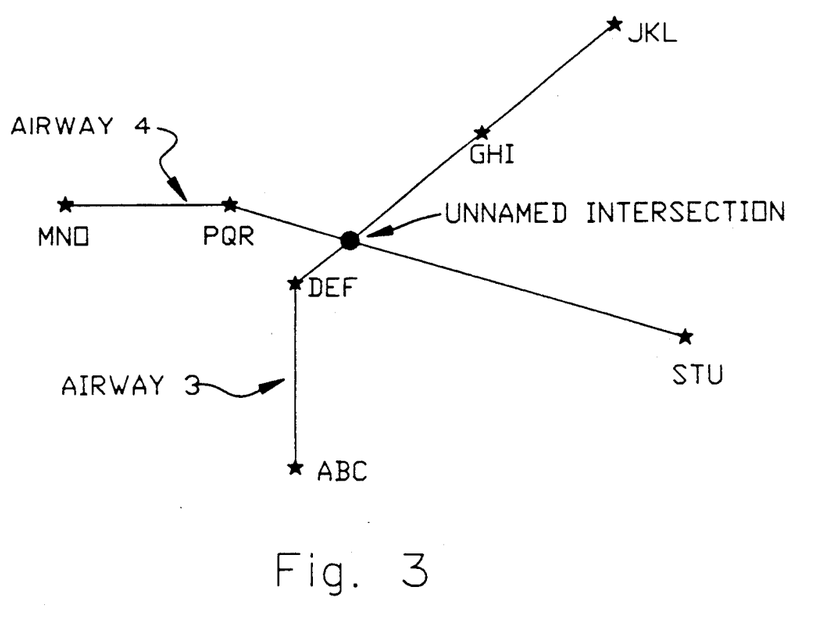
FIG. 3 is a view similar to FIG. 2, showing two intersecting airways, but with the point of intersection of the two airways being at an unnamed location, this being done to illustrate the manner in which the navigational system incorporating the present invention could cause the airplane to fly along one airway to the point of intersection, and then along the other airway to the point of destination.

Let us now take the same situation as described above with reference to FIG. 2, but let it be assumed that there is no waypoint at the intersection of the two airways. With reference to FIG. 3, there are shown airways 3 and 4 which intersect at an unnamed intersection of the two flight path segments DEF-GHI and PQR-STU. Let it further be assumed that the aircraft is departing from point ABC to the unnamed intersection and then wishes to turn onto airway 4 to travel to point MNO.

If this is to be accomplished in accordance with the flight management technology which existed prior to the present invention, the pilot would be able to utilize the auto-pilot to travel from point ABC to point DEF. Thereafter, to travel to the point of intersection and turn onto airway 4, the pilot would follow one of two procedures. First, he could switch the aircraft over to manual controls and manually fly the plane along the flight path DEF-GHI to the point of intersection and then manually fly the aircraft onto airway 4 to travel toward waypoint PQR, from which the aircraft would travel to the destination MNO. A second method would be for the pilot to estimate (or calculate roughly) the distance from DEF to the unnamed intersection and enter instructions into the flight management computer for the aircraft to travel the calculated distance along the bearing dictated by the flight segment DEF-GHI, after which the aircraft would be directed by the computer to make a turn to the left along the bearing toward point PQR.

The present invention provides a system and method by which the flight control system is able to accomplish all of this automatically. A situation such as this could incur when an airplane is flying, for example, from Seattle, Wash. to Boise, Id. via two flight paths designated J5 and J15. These two airways intersect each other only at one unnamed location just south of Dalles, Oreg. In accordance with the prior art, there is no convenient way to enter a flight plan that defines the unnamed intersection. However, in accordance with the present invention, the pilot is able to enter on the keyboard 18 his present location (i.e. Seattle) and the route on which the pilot is flying from Seattle (i.e. airway J5). Then the pilot types in the second airway (J15), and also the end destination, which is Boise. This is entered into the flight management computer, and from that point on the computer identifies the point of intersection and establishes the route from Seattle to the point of intersection and then along the second airway to Boise.

Another situation could occur where the pilot needs to make a course change while the plane is in flight. For example, the intended designation may be fogged in, and it is necessary for the pilot to travel to another airport which is not on his presently intended flight path. Under these circumstances, the pilot would normally already have entered his present flight plan into the computer, and the airplane position would be known from the airplanes inertial guidance system, or possibly from other inputs. The pilot would enter the new airway which the pilot intends to take and also the new destination. The computer would then identify the point of intersection and would be able to direct the aircraft along the modified flight path to the new point of destination.

Figure 4:
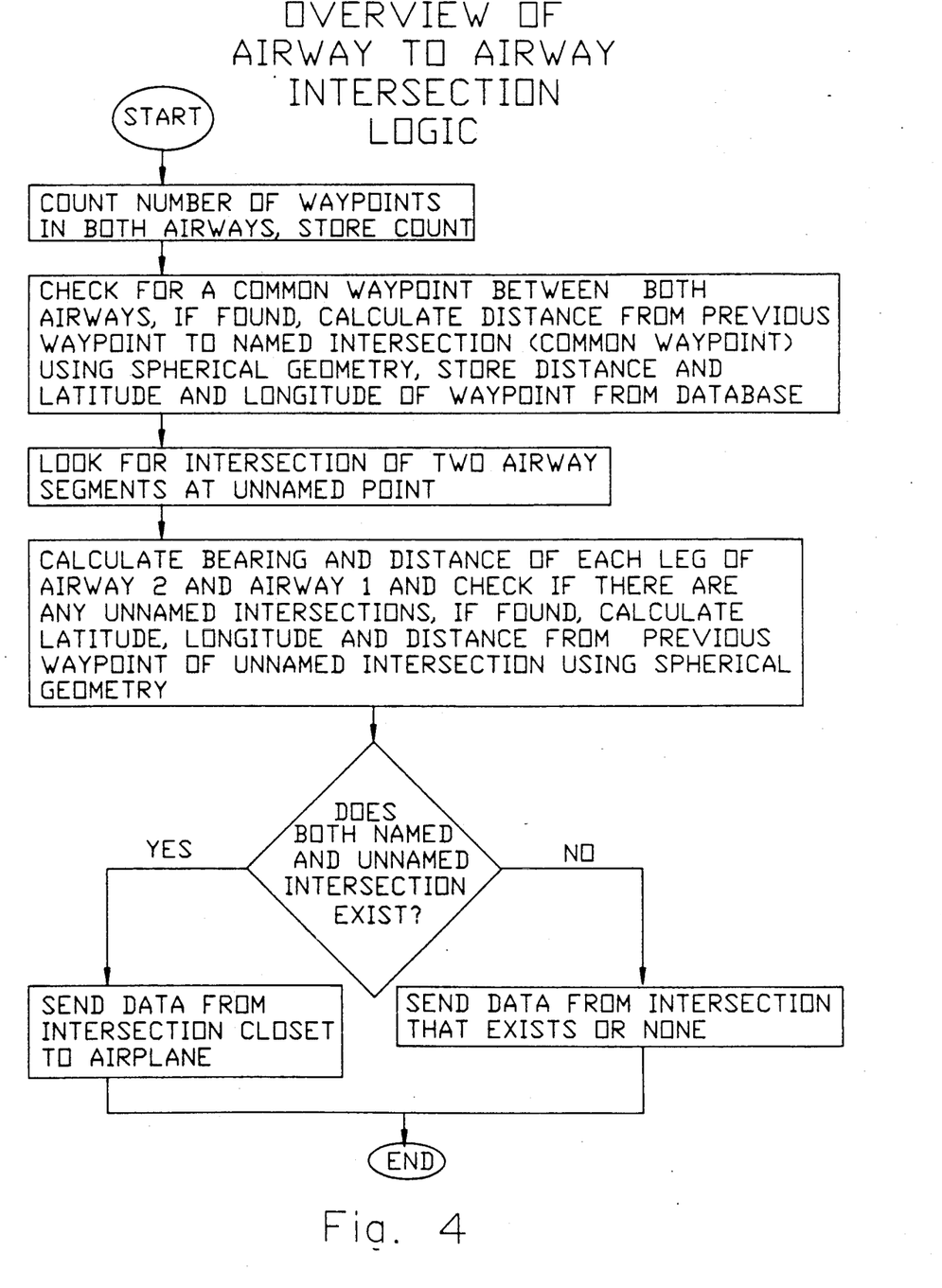
FIG. 4 is a flow chart broadly describing a method of identifying a point of intersection of two airways and implementing a flight plan along one airway to the point of intersection and then from the point of intersection along another airway to the point of destination, this being done in accordance with the teachings of the present invention.

To provide an overview as to how this is accomplished, reference is now made to FIG. 4. At the "start", the pilot has made the necessary entries into the flight management computer (i.e. the pilot has entered the present location of the aircraft along with the present airway on which the plane is traveling or is to travel, and also the second airway and the destination). The first step is for the computer to count the number of waypoints in both airways, and this is stored in a temporary memory. Then the computer checks for a common waypoint on both airways. If such a common waypoint is found, then the computer calculates the distance from the previous waypoint on the first airway to the named intersection (i.e. the waypoint which is common to both airways) by using known calculating methods in spherical geometry. This information, along with the latitude and longitude of the common waypoint, is stored in a temporary memory.

With further reference to FIG. 4, the next step is to look for an intersection of two airway segments at an unnamed point of intersection. (The reason for this is that it would be possible for two airways to intersect at two separate locations, one of these being the location of a known waypoint, and the other intersection being at an unnamed point. If this occurs, then it is necessary for the computer to select one or the other of the points of intersection at which the aircraft will depart from airway one and initiate its path of travel along airway two).

This is accomplished by calculating the bearing and distance of each leg of the airways. If such an unnamed intersection is found, then the computer calculates the latitude and longitude of the unnamed intersection and also the distance from the unnamed intersection to the waypoint which is on the airway on which the airplane is traveling and which immediately precedes the unnamed intersection. This is done in a manner incorporating the following method of calculation.

The simplified method to determine the location of the unnamed intersection is to use the equation $$b = a \sin B / \sin A$$

Figure 5:
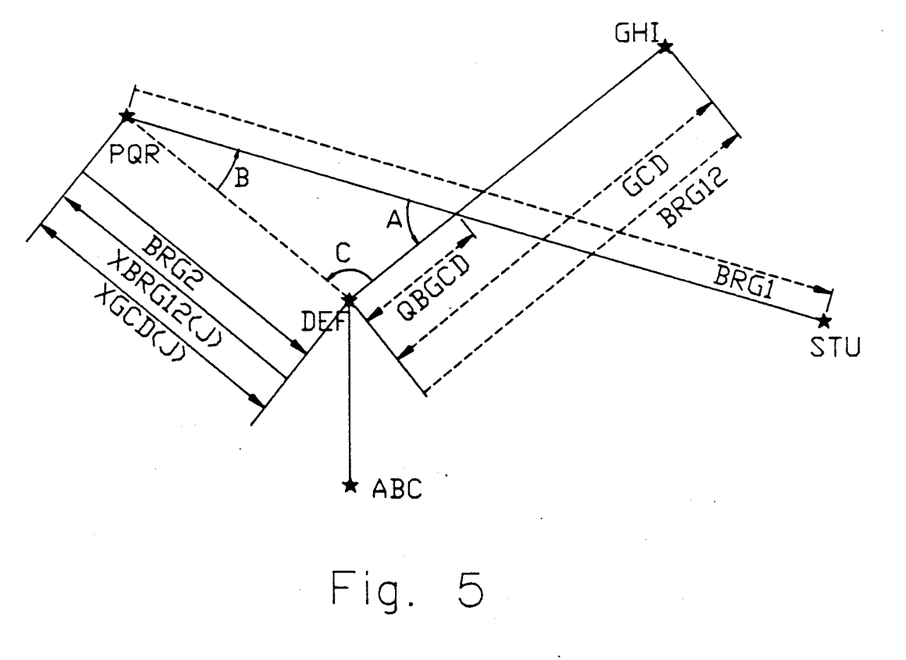
FIG. 5 illustrates two airway segments which intersect at an unnamed intersection, with certain values being designated to enable the method of calculating the latitude and longitude of the point of intersection to be explained.

Referring to FIG. 5, this equation becomes:

$$QBGCD = [XGCD(J) * \sin(B*DTOR)] / \sin(A*DTOR)$$

where DTOR is the conversion factor degrees to radians.

Again, referring to FIG. 5, the following quantities are derived as follows:
B=ABS (BRG1-BRG2)
IF (B .GT. 180.) B=360.-B
C=ABS [BRG12-XBRG12(J)]
IF (C .GT. 180.) C=360.-C
A=180.-(B+C)

With the calculation of QBGCD, knowing the latitude and longitude of waypoint DEF and bearing BRG12, the latitude and longitude of the unnamed intersection may be computed as follows.

latitude = inverse Sin [Sin (lat *DEF*) · COS (*QQBGCD/Re*) +
COS (lat *DEF*) · (Sin (*QBGCD/Re*) · COS
(*BRG*12 * *DTOR*)]

longitude = long *DEF* − Δ long if C from above is
between 0° and 179° otherwise longitude = long *DEF* + Δ long where Δ long = inverse COS [COS (*QBGCD/Re*) −
[Sin (lat *DEF*) · Cos (*QBGCD/Re*) +
COS (lat *DEF*) · Sin (*QBGCD/Re*) ·
COS (*BRG*12 · *DTOR*)] + Sin (lat *DEF*)]

where Re is the radius of the earth.

The next step is for the computer to determine whether both a named and an unnamed intersection exist. If both exist, then the computer determines which intersection is closest to the airplane, and the computer will then enter as part of the flight plan the data from the intersection which is closest to the airplane. If both an unnamed and a named intersection do not exist, then the data from the intersection that does exist is entered as part of the flight plan.

With the foregoing having been presented as an overview, we will now follow the step by step process of the present invention as it would be applied to an airplane which is traveling along the airways three and four as shown in FIG. 3. Let us take the same situation as discussed previously in this specification, where there is an aircraft at point ABC which is to travel along airway three to point JKL, but it is desired to have the aircraft leave airway three to travel to the point of intersection with airway four and then toward the destination MNO. Thus, the airplane is to travel the flight segment from ABC to DEF, after which the airplane continues on the flight segment from DEF to GHI only to the unnamed intersection, where the airplane then turns left onto the flight segment extending from STU to PQR, with the airplane traveling to PQR and then on to the destination MNO.

As indicated previously, the pilot could enter the entire flight plan as noted in the preceding paragraph, into the flight management computer prior to take-off. Alternatively, the pilot may already be in route on airway three (e.g., traveling the segment ABC-DEF) and desire to make a change in course so that instead of going to the destination JKL, the airplane would be caused to travel to the point of the unnamed intersection on airway four and then to destination MNO. For the purposes of the present explanation, we will assume that the pilot is preparing to leave the waypoint location ABC and begin the flight. As indicated previously, the first step is for the pilot to enter by means of the keypad 18 into the control display unit 12 the following information:

First, the present aircraft location (i.e. point ABC) and the flight path (airway three), and second the identification of the second airway (i.e. airway four) and the end destination (point MNO) are entered into the CDU 12. As indicated previously, with this information inserted into the flight management computer, in accordance with the process of the present invention, the computer has the capability of guiding the plane along the proper flight path to the unnamed point of intersection and thence to the point of final destination on airway four. This will be described below. For clarity of presentation, the steps will be divided into major headings and sub-headings. Reference will be made to FIGS. 6A-6G to indicate which portions of the flow chart of FIGS. 6A-6G relate to the steps presented in the following text. It is assumed that there has already been entered into the data base of the computer the required information about each of the airways which are possibly being selected, along with the appropriate information as to the information as to location of each of the waypoints of each airway.

1. Initial Procedures a. The computer first identifies those regions of the data base which contain the information about the two airways which have been entered as part of the flight plan, (i.e., airway three and airway four). The number of waypoints in airway three is counted and stored in a temporary storage area in the computer's memory, and the number of waypoints in airway four is counted and stored in a second area of the temporary memory of the computer. The computer determines whether the number of waypoints in each of the airways is two or greater. If not, the airways are not valid and the computer process terminates. If yes, then the process continues. (These steps are disclosed in FIG. 6A.)

b. On the assumption that there are two or more waypoints in each of airway three and four, then the waypoints in airway three are compared to the waypoints in airway four to see if any one of the waypoints constitutes a named intersection (i.e. whether a waypoint is positioned on both airway three and airway four). If yes, the computer calculates the distance from the immediately previous waypoint on airway three and stores this information, along with the latitude and longitude of that common waypoint. (These steps are disclosed in FIG. 6B.)

Figure 6A:
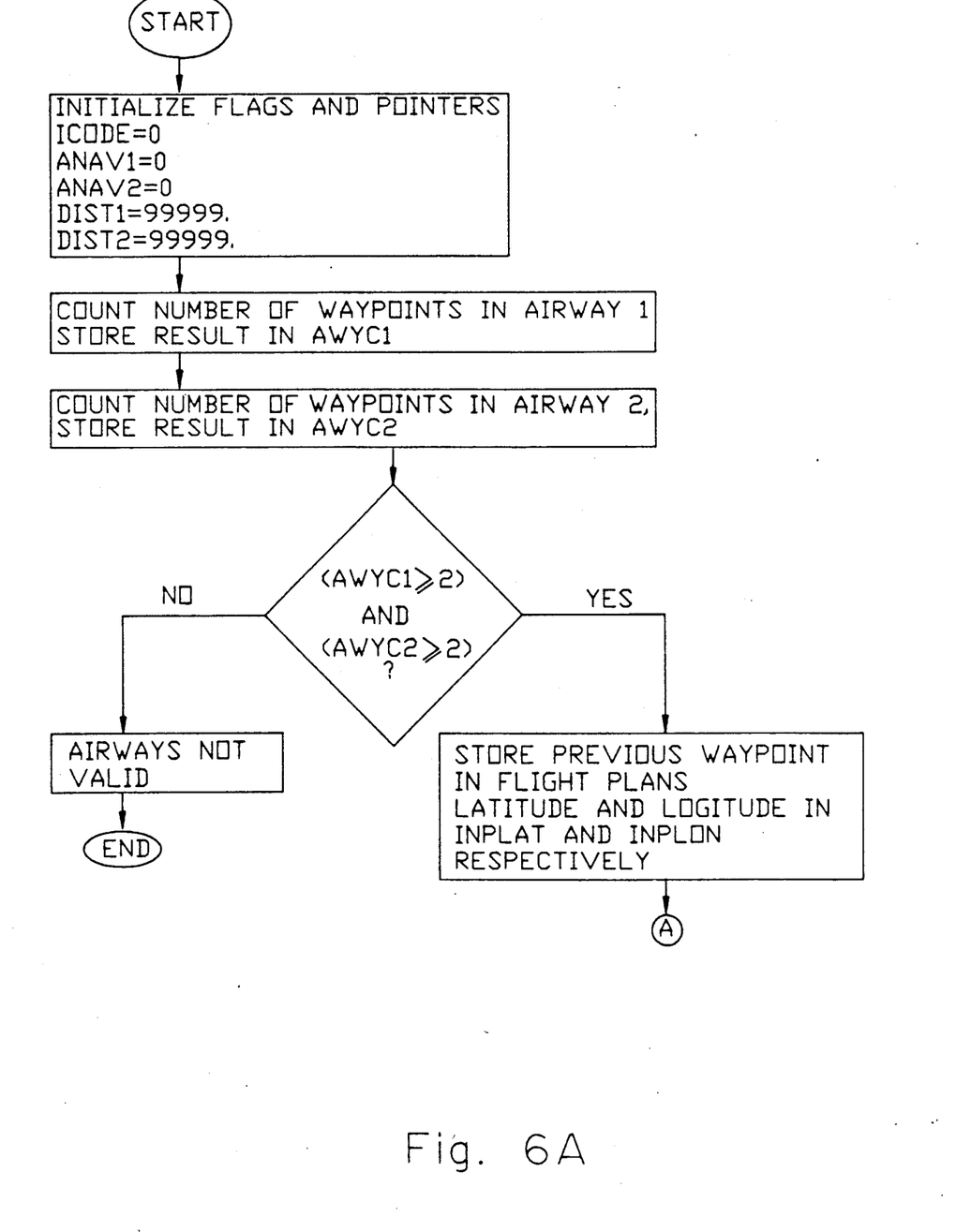
FIGS. 6A through 6G illustrate a more detailed flow chart of the method of the present invention.
Figure 6B:
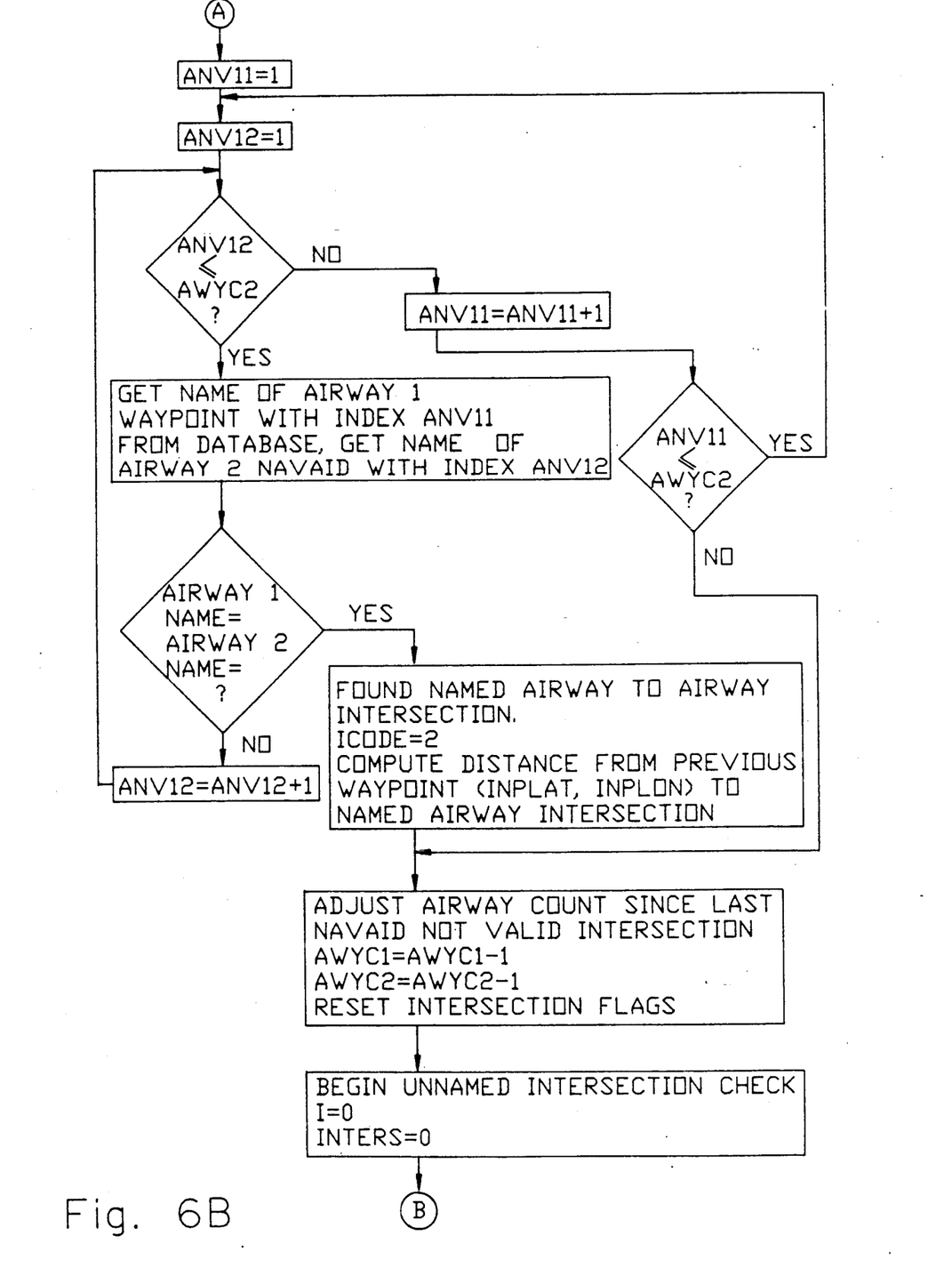
Figure 6C:
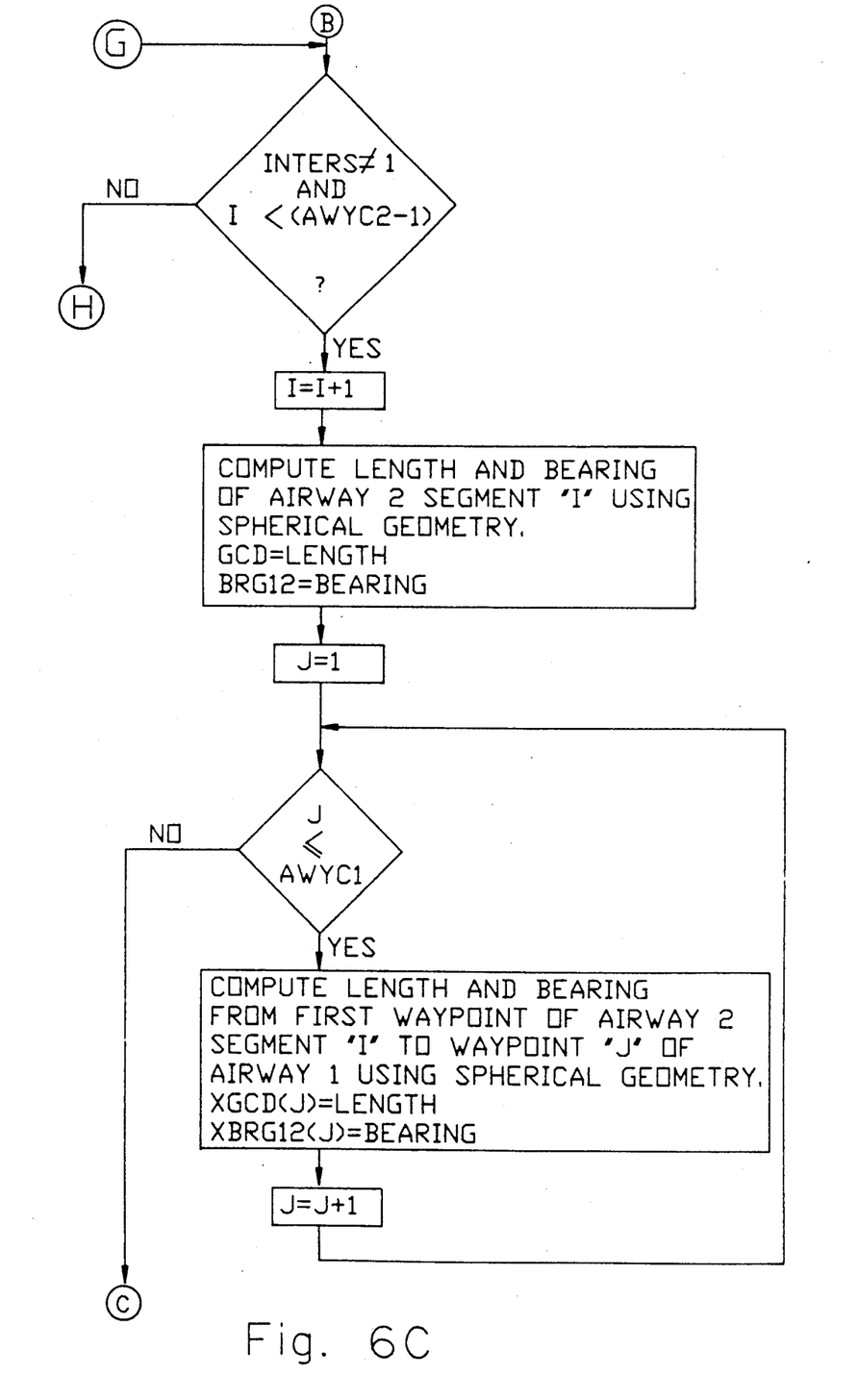
Figure 6D:
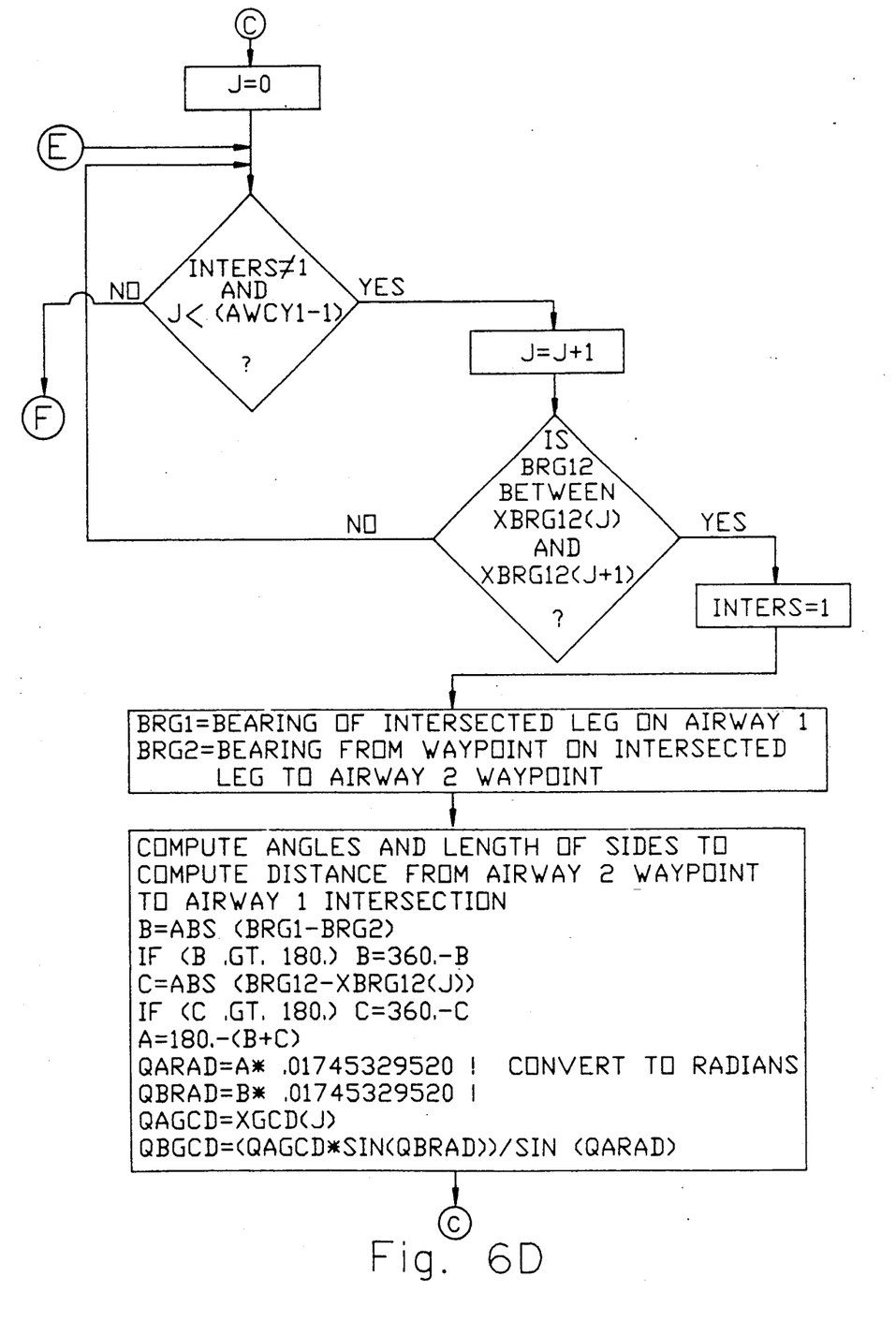
Figure 6E:
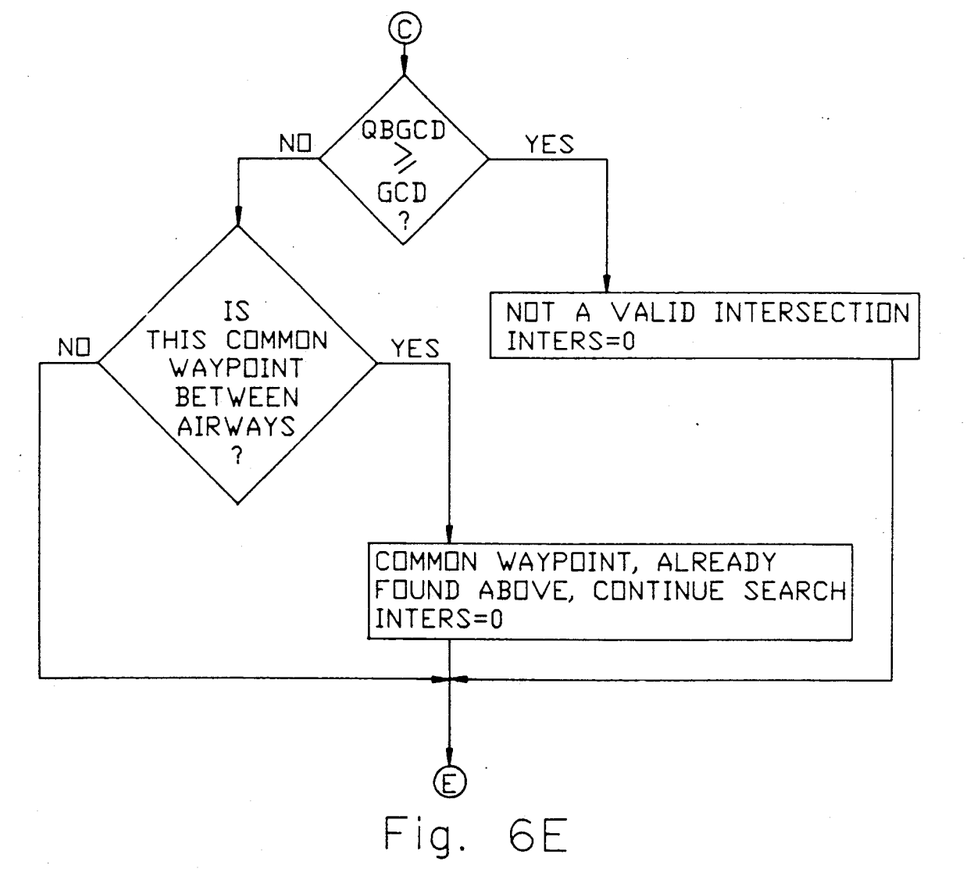
Figure 6F:
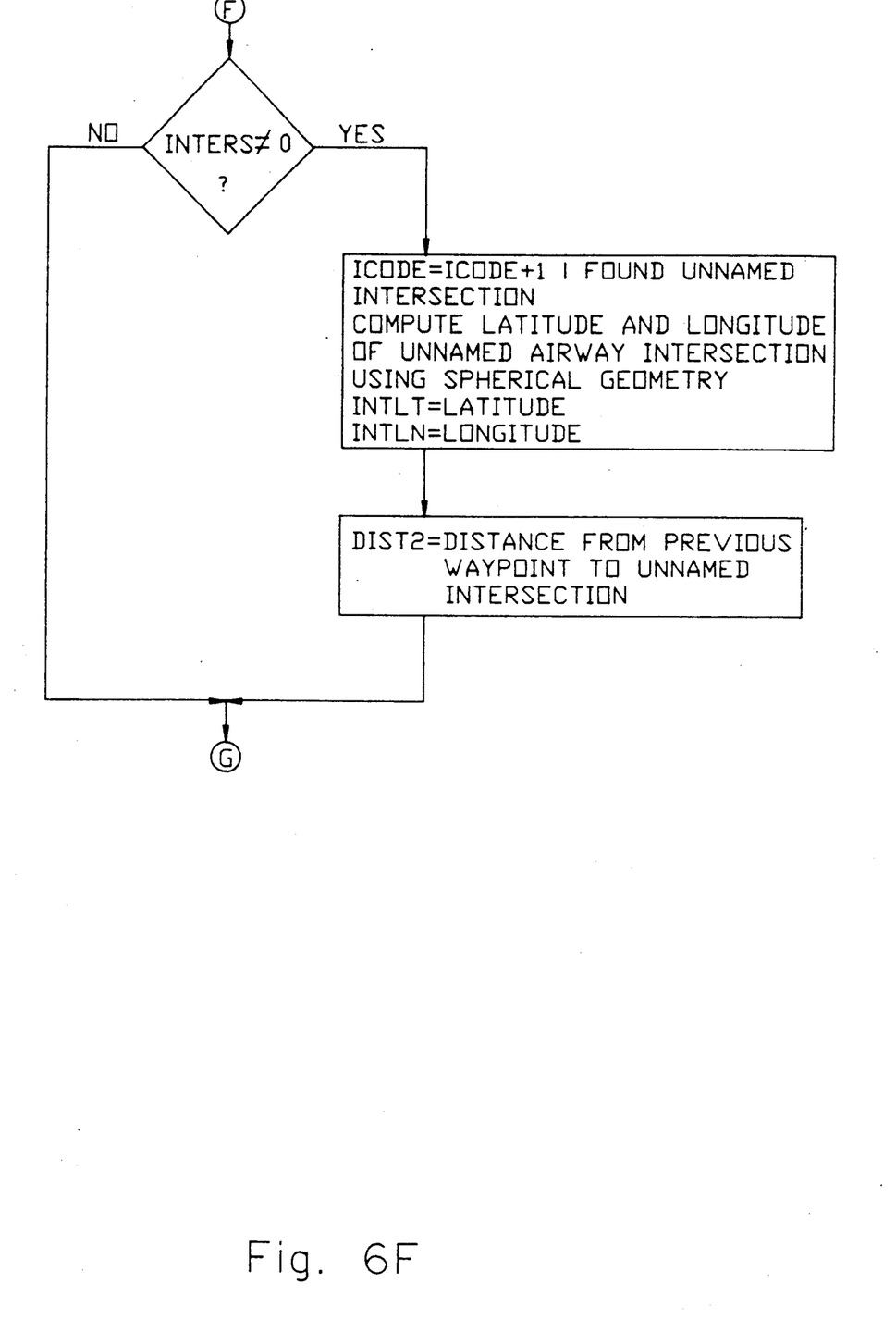
Figure 6G:
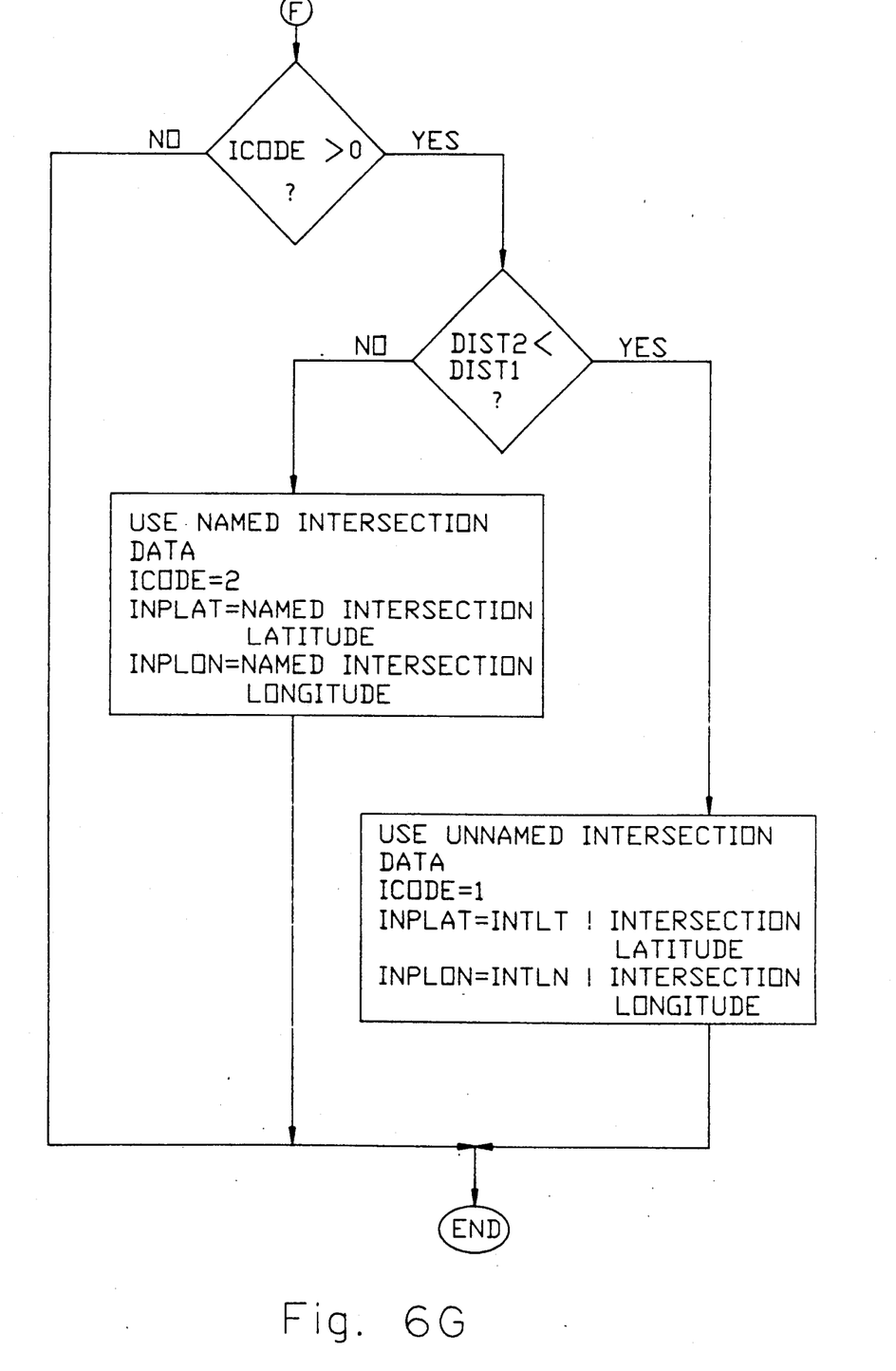

2. Ascertaining Any Unnamed Intersection and Calculating the Information Related to the Same a. The computer then calculates the bearing and distance of the flight segment of airway three on which the plane is currently traveling. In the present example, since the plane is preparing to depart from waypoint ABC, the computer would calculate the bearing and distance of airway segment ABC-DEF. If the plane were already aloft and flying on this first airway segment, then the computer would also compute the bearing and length of this same airway segment ABC-DEF. (These steps are disclosed in FIG. 6C.)

b. The bearing of the first segment of airway three (ABC-DEF) is compared with the bearing from the initial waypoint of the first segment of airway three (waypoint ABC) to each of the waypoints on airway four to determine if the bearing of the first segment of airway three (segment ABC-DEF) is between any two of the bearing from the first waypoint of the first segment (waypoint ABC) to two waypoints on airway four. In this particular instance, the computer would ascertain that the bearing of ABC-DEF lies outside the bearing of point ABC to MNO and from ABC to PQR. Thus, the computer would reject that and go on to the next segment PQR-STU. The computer would then recognize that the bearing ABC-DEF is in fact between the bearing ABC-PQR and ABC-STU. Once it is determined that the bearing from point ABC to DEF does lie between the bearing from ABC to PQR and from ABC to STU, the computer then finds the actual point of intersection of the bearing of segment ABC-DEF with the segment PQR-STU and calculates the distance of ABC to that point of intersection. (These steps are shown in FIG. 6D.)

c. If the length of ABC to the point of intersection with the fight segment PQR-STU is greater than the length of the airway segment ABC-DEF, then the computer ascertains that there is no actual point of intersection between the airway segment ABC-DEF and the airway segment PQR-STU. A similar analysis would continue with the other waypoints on airway four, but no point of intersection would be found. With the computer having found in the immediate preceding step that a point of intersection has not been found, the computer then proceeds to the next segment on the first airway (i.e. segment DEF-GHI and follows the same procedure as described above. (These steps are shown in FIG. 6E.)

d. The bearing of waypoint of DEF to each of the waypoints MNO, PQR and STU are ascertained, and it is found that the bearing of DEF-GHI is between the bearings of DEF-PQR and DEF-STU. Further computation finds that the distance from DEF along the segment DEF-GHI to the segment PQR-STU is less than the distance from DEF to GHI. Thus, it is found that an actual point of intersection does exist for segment DEF-GHI and segment PQR-STU. After the actual intersection is determined, then the latitude and longitude of that intersection are ascertained by conventional spherical geometry calculations. (These steps are shown in FIG. 6F. ALso, the connection between point G at the end of FIG. 6 and point H at the beginning of FIG. 6G is a feedback loop that is shown in FIG. 6C.)

3. Comparing Any Points of Intersection and Entering the Appropriate Data into the Flight Plan of the Flight Management Control Computer a. The computer then inquires as to whether both a named intersection exists (in accordance with section 1 of this process ) and an unnamed intersection exists (in accordance with section 2 of this process). If both such intersections exist, the computer compares the locations of these two intersections to determine which is closest to the location of the airplane. The data from the intersection closest to the airplane is then entered into the computer to make this part of the flight plan. If only one of the intersections exists, then the computer enters the data of that existing intersection into the appropriate section of the computer to become part of the flight plane. If no intersection exists, then the process stops, and this information is communicated to the pilot (i.e., a message is sent to the CDU display window 20 stating "invalid entry"). (These steps are shown in FIG. 6G.)

With the foregoing being accomplished by the flight management computer 10, the auto-pilot can be controlled by the computer 10 set to cause the airplane to travel along airway three to the waypoint DEF and then to the unnamed point of intersection, after which the computer will cause the auto-pilot to turn the plane onto airway four toward point PQR, with the airplane traveling on toward waypoint MNO.

By standard techniques, the CRT can be caused to display the flight segment on which the plane is currently traveling, along with an indication of the location of the airplane. Also, the CRT 17 can be caused to go into its plan mode or map mode and display the actual flight path of the airplane. (The extent of the area which can be displayed will depend upon the capability of the particular flight management system being used.) Further, the flight management system can be operated to display on CRT 17 other portions of the flight path which are in advance of the present location of the airplane.

With regard to the manner in which the calculations of the bearings and distances are accomplished, this can be done in accordance with standard practices which are well known in spherical geometry. These are discussed to some extent in the aforementioned U.S. Pat. No. 4,692,869. Since such techniques are well known to those of ordinary skill in the art, these will not be discussed in any detail in this text.

What is claimed is:

1. An aircraft navigational system to provide flight path information for an aircraft to travel along a first airway to a point of intersection with a second airway, and then to travel along said second airway, said system comprising:

a. a flight path information input means adapted to receive and provide information designating said first airway as a first path of travel and information designating said second airway as a second path of travel;

b. a navigational computer means comprising:
i a memory means which contains information of identification and locations of waypoints on said first and second airways;
ii. identifying and calculating means to identify a first airway segment which is on said first airway and which intersects a second airway segment which is on said second airway, and to ascertain a location of an unnamed point of intersection of said first and second segments under circumstances where said unnamed point of intersection is not located at any waypoint on said first and second airways; and
iii. output flight control means operatively interconnected with said identifying and calculating means to provide flight path guidance data for a first flight path portion along said first segment to said point of intersection and for a second flight path portion from said point of intersection along said second segment, whereby said flight guidance data can be utilized to cause said aircraft to travel along said first flight path portion and then along said second flight path portion.

2. The system as recited in claim 1, wherein said identifying and calculating means ascertains whether a waypoint exists at a named point of intersection of said first and second airways.

3. The system as recited in claim 2, wherein said identifying and calculating means ascertains whether more than one point of intersection of said first and second airways exists and to select a first point of intersection which occurs first on said first path of travel and to select said first point of intersection as the point of intersection on which the second flight path portion is initiated.

4. The system as recited in claim 1, wherein said identifying and calculating means ascertains whether more than one point of intersection of said first and second airways exists and to select a first point of intersection which occurs first on said first path of travel and to select said first point of intersection as the point of intersection on which the second flight path portion is initiated.

5. The system as recited in claim 1, wherein said navigational computer means is arranged to ascertain said unnamed point of intersection by calculating a distance from a waypoint on said first segment to said unnamed point of intersection and ascertaining location of said unnamed point of intersection by calculations based on said distance and on a bearing of said first segment.

6. The system as recited in claim 5, wherein said unnamed point of intersection is ascertained by ascertaining said distance and bearing from said waypoint on said first segment to a waypoint on said second segment, ascertaining an angle formed by a line from said waypoint on said first segment to said waypoint on said second segment with said second segment, and computing said distance from the waypoint on the first segment to said unnamed point of intersection trigonometrically from information of said distance from the waypoint on the first segment to the waypoint on the second segment, said angle, and a second angle which is formed by two sides of a triangle defined by said waypoints on said first and second segments and said unnamed point of intersection.

7. The system as recited in claim 6, wherein said computation to identify said unnamed point of intersection is accomplished by application of a formula:

$$b = a \sin B / \sin A$$

where a and b are two of the three sides of a triangle and A and B are angles of the triangle located opposite sides a and b, respectively.

8. The system as recited in claim 1, wherein said identifying and calculating means is arranged to identify a common waypoint on both of said first and second airways, and to store said common waypoint, if said common waypoint exists, in temporary memory means and to identify a distance from a previous waypoint on said first airway to the common waypoint, then to ascertain whether any unnamed point of intersection exists where there is no waypoint, then to ascertain whether both said unnamed point of intersection and said common waypoint exist, then to calculate whether said common waypoint or said unnamed point of intersection is closer to said previous waypoint, then to provide said flight path guidance data designating said first flight path portion from said previous waypoint to that point of intersection selected from the common waypoint and the unnamed point of intersection which is closer to said previous waypoint.

9. The system as recited in claim 8, wherein said unnamed point of intersection is determined by identifying bearing of an initially examined segment of said first airway and then determining whether the bearing of the initially examined segment extends between any two waypoints on said second airway and then ascertaining position of said initially examined segment relative to a segment extending between said any two waypoints of the second airway to ascertain whether the initially examined segment intersects with said segment which is between said any two waypoints, and under circumstances where said initially examined segment does not intersect with said segment between said any two waypoints, then examining another segment on said first airway by ascertaining bearing and location of said another segment relative to segments extending between waypoints on said second airway.

10. The system as recited in claim 1, wherein said unnamed point of intersection is determined by identifying bearing of an initially examined segment of said first airway and then determining whether the bearing of the initially examined segment extends between any two waypoints on said second airway and then ascertaining position of said initially examined segment to a segment extending between said any two waypoints of the second airway to ascertain whether the initially examined segment intersects with said segment which is between said any two waypoints, and under circumstances where said initially examined segment does not intersect with said segment between said any two waypoints, then examining another segment on said first airway by ascertaining bearing and location of said another segment relative to segments extending between waypoints on said second airway.

11. An aircraft navigational system to provide flight path information for an aircraft to travel along a first airway comprising a plurality of first segments to a point of intersection with a second airway comprising a plurality of second segments, and then to travel along said second airway, said system comprising:

a. a flight path information input means adapted to receive and transmit information designating said first airway as a first path of travel and a departure location on said first airway and information designating said second airway as a second path to travel and a destination location on said second airway;

b. a navigational computer means comprising:
  i. a memory which contains information of identification and locations of waypoints on said first and second airways;
  ii. output flight control means to provide flight path guidance data for a first flight path portion along said first airway to a selected point of intersection with said second airway and for a second light path portion from said selected point of intersection along said second airway to said destination location;
  iii. identifying and calculating means to identify said selected point of intersection and to develop said flight path guidance data for said output flight control means, said identifying and calculating means being arranged:
    1. to ascertain whether any waypoint is positioned on both of said first and second airways so as to constituted a common waypoint which is named point of intersection;
    2. if said named point of intersection exists, then to compute a distance from a previous waypoint on said first airway to said named point of intersection;
    3. to ascertain existence of an unnamed point of intersection of said first and second airways which is not located on said common waypoint;
    4. if said unnamed point of intersection exists, computing location of said unnamed point of intersection and calculating a distance from a previous waypoint on said first airway to said unnamed point of intersection;
    5. to ascertain whether both said named and unnamed points of intersection exist or whether only one of said named and unnamed points of intersection exists, and in the event that both of said named and unnamed points of intersection exist, selecting that point of intersection which is closest to said previous waypoint on said first airway, and if only one of said named and unnamed points of intersection exists, selecting that point of intersection which does exist;

6. to incorporate the selected point of intersection in a flight plan which comprises a first flight path portion along said first airway to the selected point of intersection, and a second flight path portion from said selected point of intersection along said second segment.

12. The system as recited in claim 11, wherein said navigational computer means is arranged to ascertain said unnamed point of intersection by calculating a distance from a waypoint on said first segment to said unnamed point of intersection and ascertaining location of said unnamed point of intersection by calculations based on said distance and on a bearing of said first segment.

13. The system as recited in claim 12, wherein said unnamed point of intersection is ascertained by ascertaining said distance and bearing from said waypoint on said first segment to a waypoint on said second segment, ascertaining an angle formed by a line from said waypoint on said first segment to said waypoint on said second segment with said second segment, and computing said distance from the waypoint on the first segment to said unnamed point of intersection trigonometrically from information of said distance from the waypoint on the first segment to the waypoint on the second segment, said angle, and a second angle which is formed by two sides of a triangle defined by said waypoints on said first and second segments and said unnamed point of intersection.

14. The system as recited in claim 13, wherein said computation to identify said unnamed point of intersection is accomplished by application of a formula:

$$b = a \sin B / \sin A$$

where a and b are two of the three sides of a triangle and A and B are angles of the triangle located opposite sides a and b, respectively.

15. The system as recited in claim 14, wherein said unnamed point of intersection is determined by identifying bearing of an initially examined segment of said first airway and then determining whether the bearing of the initially examined segment extends between any two waypoints on said second airway and then ascertaining position of said initially examined segment relative to a segment extending between said any two waypoints of the second airway to ascertain whether the initially examined segment intersects with said segment which is between said any two waypoints, and under circumstances where said initially examined segment does not intersect with said segment between said any two waypoints, then examining another segment on said first airway by ascertaining bearing and location of said another segment relative to segments extending between waypoints on said second airway.

16. The system as recited in claim 11, wherein said unnamed point of intersection is determined by identifying bearing of an initially examined segment of said first airway and then determining whether the bearing of the initially examined segment extends between any two waypoints on said second airway and then ascertaining position of said initially examined segment to a segment extending between said any two waypoints of the second airway to ascertain whether the initially examined segment intersects with said segment which is between said any two waypoints, and under circumstances where said initially examined segment does not intersect with said segment between said any two waypoints, then examining another segment on said first airway by ascertaining bearing and location of said another segment relative to segments extending between waypoints on said second airway.

17. A method to provide flight path information for an aircraft to travel along a first airway to a point of intersection with a second airway, and then to travel along said second airway, said system comprising:

a. providing to a flight path information input means information designating said first airway as a first path of travel and information designating said second airway as a second path of travel;

b. providing said information to a navigational computer means which has a memory means which contains information of identification and locations of waypoints on said first and second airways;

c. operating an identifying and calculating means of said navigation computer means to identify a first airway segment which is on said first airway and which intersects a second airway segment which is on said second airway, and to ascertain a location of an unnamed point of intersection of said first and second segments under circumstances where said unnamed point of intersection is not located at any waypoint on said first and second airways; and d. operating output flight control means which is operatively interconnected with said identifying and calculating means to provide flight path guidance data for a first flight path portion along said first segment to said point of intersection and for a second flight path portion from said point of intersection along said second segment, whereby said flight guidance data can be utilized to cause said aircraft to travel along said first flight path portion and then along said second flight path portion.

18. The method as recited in claim 17, wherein said identifying and calculating means is operated to ascertain whether a waypoint exists at a named point of intersection of said first and second airways.

19. The method as recited in claim 18, wherein said identifying and calculating means is operated to ascertain whether more than one point of intersection of said first and second airways exists and to select a first point of intersection which occurs first on said first path of travel and to select said first point of intersection as the point of intersection on which the second flight path portion is initiated.

20. The method as recited in claim 17, wherein said identifying and calculating means is operated to ascertain whether more than one point of intersection of said first and second airways exists and to select a first point of intersection which occurs first on said first path of travel and to select said first point of intersection as the point of intersection on which the second flight path portion is initiated.

21. The method as recited in claim 17, wherein said navigational computer means is operated to ascertain said unnamed point of intersection by calculating a distance from a waypoint on said first segment to said unnamed point of intersection and ascertaining location of said unnamed point of intersection by calculations based on said distance and on a bearing of said first segment.

22. The method as recited in claim 21, wherein said unnamed point of intersection is ascertained by ascertaining said distance and bearing from said waypoint on said first segment to a waypoint on said second segment, ascertaining an angle formed by a line from said waypoint on said first segment to said waypoint on said second segment with said second segment, and computing said distance from the waypoint on the first segment to said unnamed point of intersection trigonometrically from information of said distance from the waypoint on the first segment to the waypoint on the second segment, said angle, and a second angle which is formed by two sides of a triangle defined by said waypoints on said first and second segments and said unnamed point of intersection.

23. The method as recited in claim 17, wherein said identifying and calculating means is operated to identify a common waypoint on both of said first and second airways, and to store said common waypoint, if said common waypoint exists, in temporary memory means and to identify a distance from a previous waypoint on said first airway to the common waypoint, then to ascertain whether any unnamed point of intersection exists where there is no waypoint, then to ascertain whether both said unnamed point of intersection and said common waypoint exist, then to calculate whether said common waypoint or said unnamed point of intersection is closer to said previous waypoint, then to provide said flight path guidance data designating said first flight path portion from said previous waypoint to that point of intersection selected from the common waypoint and the unnamed point of intersection which is closer to said previous waypoint.

24. The method as recited in claim 23, wherein said unnamed point of intersection is determined by identifying bearing of an initially examined segment of said first airway and then determining whether the bearing of the initially examined segment extends between any two waypoints on said second airway and then ascertaining position of said initially examined segment relative to a segment extending between said any two waypoints of the second airway to ascertain whether the initially examined segment intersects with said segment which is between said any two waypoints, and under circumstances where said initially examined segment does not intersect with said segment between said any two waypoints, then examining another segment on said first airway by ascertaining bearing and location of said another segment relative to segments extending between waypoints on said second airway.

25. The method as recited in claim 17, wherein said unnamed point of intersection is determined by identifying bearing of an initially examined segment of said first airway and then determining whether the bearing of the initially examined segment extends between any two waypoints on said second airway and then ascertaining position of said initially examined segment to a segment extending between said any two waypoints of the second airway to ascertain whether the initially examined segment intersects with said segment which is between said any two waypoints, and under circumstances where said initially examined segment does not intersect with said segment between said any two waypoints, then examining another segment on said first airway by ascertaining bearing and location of said another segment relative to segments extending between waypoints on said second airway.

26. A method to provide flight path information for an aircraft to travel along a first airway comprising a plurality of first segments to a point of intersection with a second airway comprising a plurality of second segments, and then to travel along said second airway, said system comprising:

a. providing to a flight path information input means information designating said first airway as a first path of travel and a departure location on said first airway and information designating said second airway as a second path of travel and a destination location on said second airway;

b. providing said information to a navigational computer means comprising a memory which contains information of identification and locations of waypoints on said first and second airways;

c. operating an identifying and calculating means of said navigational computer means to:
  i. ascertain whether any waypoint is positioned on both of said first and second airways so as to constitute a common waypoint which is a named point of intersection;
  ii. if said named point of intersection exists, then compute a distance from a previous waypoint on said first airway to said named point of intersection;
  iii. ascertain existence of an unnamed point of intersection of said first and second airways which is not located on said common waypoint;
  iv. if said unnamed point of intersection exists, compute location of said unnamed point of intersection and calculating a distance from a previous waypoint on said first airway to said unnamed point of intersection;
  v. ascertain whether both said named and unnamed points of intersection exist or whether only one of said named and unnamed points of intersection exists, and in the event that both of said named and unnamed points of intersection exist, selecting that point of intersection which is closest to said previous waypoint on said first airway, and if only one of said named and unnamed points of intersection exists, selecting that point of intersection which does exist;
  vi. incorporate the selected point of intersection in a flight plan which comprises a first flight path portion along said first airway to the selected point of intersection, and a second flight path portion from said selected point of intersection along said second segment;

d. operating output flight control means to provide flight path guidance data for said first flight path portion and said second flight path portion.

27. The method as recited in claim 26, wherein said navigational computer means is operated to ascertain said unnamed point of intersection by calculating a distance from a waypoint on said first segment to said unnamed point of intersection and ascertaining location of said unnamed point of intersection by calculations based on said distance and on a bearing of said first segment.

28. The method as recited in claim 27, wherein said unnamed point of intersection is ascertained by ascertaining said distance and bearing from said waypoint on said first segment to a waypoint on said second segment, ascertaining an angle formed by a line from said waypoint on said first segment to said waypoint on said second segment with said second segment, and computing said distance from the waypoint on the first segment to said unnamed point of intersection trigonometrically from information of said distance from the waypoint on the first segment to the waypoint on the second segment, said angle, and a second angle which is formed by two sides of a triangle defined by said waypoints on said first and second segments and said unnamed point of intersection.

29. The method as recited in claim 26, wherein said unnamed point of intersection is determined by identifying bearing of an initially examined segment of said first airway and then determining whether the bearing of the initially examined segment extends between any two waypoints on said second airway and then ascertaining position of said initially examined segment relative to a segment extending between said any two waypoints of the second airway to ascertain whether the initially examined segment intersects with said segment which is between said any two waypoints, and under circumstances where said initially examined segment does not intersect with said segment between said any two waypoints, then examining another segment on said first airway by ascertaining bearing and location of said another segment relative to segments extending between waypoints on said second airway.

* * * * *